March 3, 1970     M. B. FRITCHEY     3,498,870

PANEL

Filed July 1, 1965

INVENTOR.
MERIL B. FRITCHEY
BY
*J. B. Holden*
ATTORNEY

United States Patent Office 3,498,870
Patented Mar. 3, 1970

3,498,870
PANEL
Meril B. Fritchey, Akron, Ohio, assignor to The Goodyear Tire & Rubber Company, Akron, Ohio, a corporation of Ohio
Filed July 1, 1965, Ser. No. 468,709
Int. Cl. B44f 7/00; B32b 3/02, 31/20
U.S. Cl. 161—19                    4 Claims

ABSTRACT OF THE DISCLOSURE

A laminated panel is provided which resembles wood-veneered panel. It is composed of (1) a substrate of hardboard having a surface roughly sanded to provide parallel straight-line striations which are relatively short compared to the length of the panel and promiscuously distributed close to one another and (2) a film adhered to the sanded surface which film has wood grain printed thereon. The printed grain of the film and the striations extend in the same direction. The striations cooperate with the printed grain, each emphasizing the other, and together they bring out a grain effect in a novel manner.

---

This invention relates to a laminate panel designed primarily for interior use, as in partitions and wall panels, and as door skins, etc.

The laminate is composed of hardboard substrate with a striated surface, and a film covering adhered thereto, the film having a representation of wood grain printed on it. This grain and the striations extend in the same directions.

Hardboard is the term used in the trade to refer to a synthetic board material composed of wood fibers bound together by their natural lignin and/or a thermosetting adhesive, and then cured under pressure. Various adhesives are used, and an adhesive mixture may be used in which all of the adhesive components are not thermosetting. The adhesive may include lignin, etc. A minor portion of non-fibrous filler may be included in the hardboard. (See Department of Commerce bulletin on Hardboard-Commercial Standard, CS 251–63.)

Hardboard is of two classes: tempered and untempered. Tempered hardboard contains more resin, or the like, than untempered and it is harder. The untempered hardboard is so soft that usually the surface cannot be satisfactorily striated by sanding and therefore, generally speaking, is not satisfactory for carrying out the invention. At the present time, the hardboard used in carrying out the invention is tempered. It may be S–2–S (smooth-two-sides) or S–1–S (smooth-one-side). If S–1–S hardboard is used, the film is laminated to the smooth surface. Before laminating the film to a smooth surface of the hardboard, whether it is S–1–S or S–2–S, this side is sanded with a coarse sandpaper which provides very low ridges and very shallow grooves very close to one another and oriented. Usually the board is longer than it is wide and customarily these striations are oriented longitudinally of the board.

Any thermoplastic, laminating film may be used in preparing the panel, the particular film selected depending upon the intended use, the costs of available films, etc. Usable films include, for example, all polyester films, poylvinyl chloride films, polyvinyl fluoride films, polycarbonate films, rubber hydrochloride film, etc. A grain is printed on the film and if the film is translucent or transparent, the grain is usually printed on the underside. The film may be colored as desired, as by printing on the film or incorporating color in the film, etc. The grain and color of the film may be selected to imitate a certain wood, such as walnut, teak, mahogany, etc.

The grain of the film and the striations of the surface of the hardboard extend in the same direction.

The film is thin and is usually applied hot. A resilient applicator is used so that the irregularities in the sanded surface are transmitted through the film and a grain effect is produced on the exposed surface. The combination of these irregularities and the printed grain give to the panel the visual effect of real wood, even more than the effect produced by printed film when the surface of the substrate has not been striated.

The procedures employed in preparing the product are well known. The sanding is performed by any usual equipment used for straight-line sanding, using a coarse sanding surface. There are many available adhesives. A mixture of a polyisocyanate and a polyester is satisfactory. The lamination is done on any usual equipment which employs a resilient pressing surface and the pressure and/or temperature required to press the film into the striations so that its exposed surface is striated. Usually the film is heated to facilitate conforming it to the sanded surface. It is of the order of 2 to 5 mils thick.

The invention is further described in connection with the accompanying drawing, in which:

FIGURE 1 shows a hardboard panel 5, one surface of which has been sanded with coarse sandpaper or the like. The low ridges and shallow valleys 7 are scarcely perceptible to the naked eye.

Figure 1:
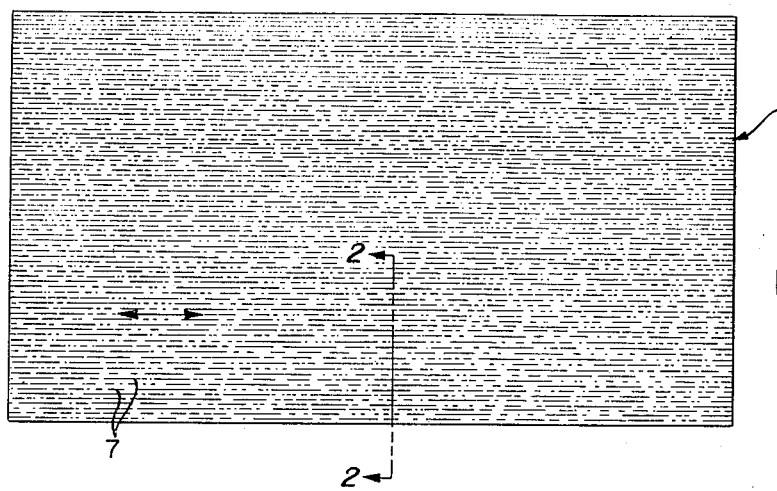
FIGURE 1 is a top view of a panel of hardboard sanded to produce striations which extend in the directions of the arrow.
Figure 2:
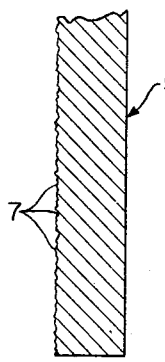
FIGURE 2 is an enlarged section through this panel on the line 2—2 of FIGURE 1.
Figure 4:
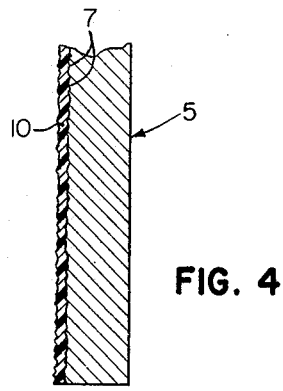
FIGURE 4 is a section on the line 4—4 of FIGURE 3.
Figure 3:
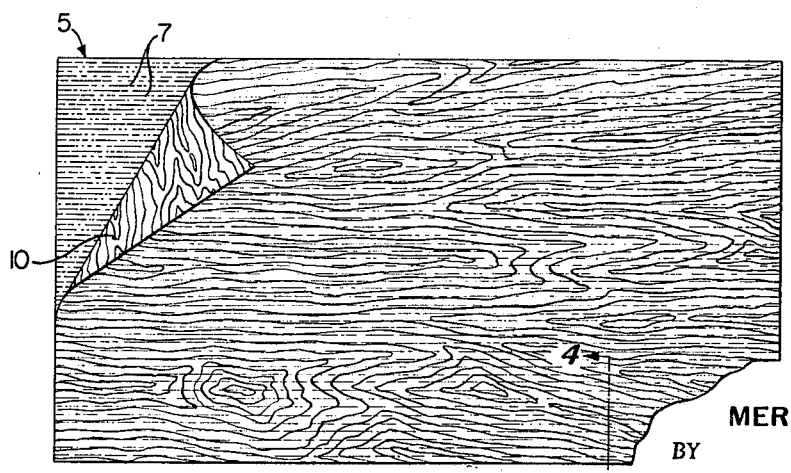
FIGURE 3 is a top view of the sanded hardboard covered with film, with one corner of the film lifted to show the striated surface of the hardboard.

The film 10 has been printed with a grain to simulate wood. Usually the grain will be selected to simulate a particular wood, and the film is colored accordingly. Thus the grain is printed on the undersurface of the film.

Adhesive is applied to the sanded surface of the hardboard or to the undersurface of the film, or both. The film is then pressed to the sanded surface with a roller which has a soft rubber or other resilient surface which presses the film to the sanded surface so that the exposed surface of the film is striated the same as the surface of the hardboard. Usually the adhesive coated surface will be heated. If the adhesive used must be heated, and it is applied to the hardboard rather than to the film, it may not be necessary to heat the film. The required temperature will depend upon the composition of the film and the adhesive, the thickness of the film, etc.

The size of the striations is not critical, the only requirement being that they give the semblance of grain to a panel. In one panel, striations provided channels varying from about 50 to 85 microns deep and about 150 to 275 microns wide, with the length varying considerably, some being about as long as 30 millimeters or longer, with many shorter ones measuring only about 15 millimeters in length or thereabout. The invention is not limited to striations of these dimensions, the same being mentioned only as illustrative of what may be used. Generally, with thicker films which will not duplicate the striations in as great detail as thinner films, more pronounced striations are desirable.

The finished panel resembles wood and is designed particularly for indoor use wherever a durable panel is required.

The invention is covered in the claims which follow.

What I claim is:

1. A laminated panel which resembles wood-veneered panel, and is composed of (1) a substrate of hardboard having a surface roughly sanded to provide parallel straight-line striations which are relatively short compared to the length of the panel and promiscuously distributed close to one another, and (2) a film adhered to the sanded surface which film has wood grain printed thereon, the printed grain of the film and the striations extending in the same direction, and the film being pressed against the striations so that the exposed surface of the film is roughened to conform approximately to the striations.

2. The panel of claim 1 in which the hardboard is tempered hardboard.

3. The panel of claim 1 in which the grain on the film is printed on the under surface of the film.

4. The method of producing a laminated panel of hardboard which hardboard has at least one smooth surface, which method comprises sanding said surface using a coarse sanding surface to produce coarse straight-line grooves thereon leaving ridges which are relatively short and narrow compared to the length and width of the panel, and laminating to this surface a thermoplastic film having imitation wood grained thereon, with the grain and the ridges oriented in the same direction, and in the lamination pressing the film against the ridges so that the exposed surface of the film is ridged.

References Cited

UNITED STATES PATENTS

| | | | |
|---|---|---|---|
| 2,228,332 | 1/1941 | Wick et al. | 156—153 |
| 2,311,156 | 2/1943 | Casto | 161—119 |
| 2,536,183 | 1/1951 | Jamieson | 156—153 |
| 3,170,832 | 2/1965 | Wilson et al. | 161—190 |
| 3,287,203 | 11/1966 | Elmendorf | 161—190 |

MORRIS SUSSMAN, Primary Examiner

U.S. Cl. X.R.

161—119; 156—153